United States Patent [19]

Kwon

[11] Patent Number: 4,745,465

[45] Date of Patent: May 17, 1988

[54] DIGITAL COLOR IMAGE PROCESSING METHOD EMPLOYING HISTOGRAM NORMALIZATION FOR TONE AND COLOR REPRODUCTION

[75] Inventor: Heemin Kwon, Pittsford, N.Y.

[73] Assignee: Eastman Kodak Company, Rochester, N.Y.

[21] Appl. No.: 843,409

[22] Filed: Mar. 24, 1986

[51] Int. Cl.[4] .................. G03F 3/08; H04N 1/46; G03B 27/80

[52] U.S. Cl. .................... 358/80; 358/75; 358/280; 358/284; 355/38

[58] Field of Search .............. 358/75, 76, 78, 80, 358/280, 283, 284, 256; 382/18, 22; 355/38, 35, 40, 41, 77, 88, 68

[56] References Cited

U.S. PATENT DOCUMENTS

| | | | |
|---|---|---|---|
| 2,972,012 | 2/1961 | Farber | 358/80 |
| 4,090,243 | 5/1978 | Kotera et al. | 358/75 |
| 4,213,150 | 7/1980 | Robinson et al. | 358/166 |
| 4,410,909 | 10/1983 | Ueda et al. | 358/75 |
| 4,467,364 | 8/1984 | Konagaya | 358/80 |
| 4,472,736 | 9/1984 | Ushio et al. | 358/75 |
| 4,553,260 | 11/1985 | Belt et al. | 382/22 |
| 4,654,722 | 3/1987 | Alkofer | 358/80 |
| 4,667,228 | 5/1987 | Kawamura et al. | 358/80 |
| 4,677,465 | 6/1987 | Alkofer | 358/80 |
| 4,685,143 | 8/1987 | Choate | 382/22 |

OTHER PUBLICATIONS

"Tone Correction of Color Picture by Histogram Modification", by Yoichi Miyake, Nippon Shashin Sakkaishi, V. 48(2), pp. 94–101, 1980.
"A Statistical Method for Image Classification and Tone Reproduction Determination", by R. Chung, Journal of Applied Photographic Engineering, vol. 3, No. 2, Spring, 1977, pp. 74–81.
"A New Approach to Programming in Photomechanical Reproduction", by Yu. Ovchinnikov et al., the 12th IARIGAI Conference Proceedings, Versailles, France, pp. 160–163, 1974.

Primary Examiner—James J. Groody
Assistant Examiner—Randall S. Svihla
Attorney, Agent, or Firm—Thomas H. Close

[57] ABSTRACT

A digital color image processing method includes generating color reproduction functions by normalizing samples of color values from the image, and processing the color components of the color digital image by applying the color reproduction functions to the respective color components of the digital image. The samples of color values are selected from the digital image by operating on a luminance component of the digital color image with an image detail detection operator to detect regions of the image representing luminance detail, and operating on the color components of the digital image in the luminance detail regions with a contrast detection filter to detect the contrast of the color components of the image in the luminance detail regions. The color values in the luminance detail regions are separated into contrast intervals and histograms in the contrast intervals are formed. One of the contrast intervals is selected based on the similarity in shape of the color value histograms in the contrast interval. The color reproduction functions are formed by normalizing the histograms in the selected contrast interval.

6 Claims, 10 Drawing Sheets

PRIOR ART

DIGITAL COLOR IMAGE PROCESSING METHOD EMPLOYING HISTOGRAM NORMALIZATION FOR TONE AND COLOR REPRODUCTION

TECHNICAL FIELD

The invention relates to digital color image processing and more particularly, to a method of digital color image processing wherein tone and color corrections are effected by histogram modification.

BACKGROUND ART

In the practice of digital color image processing, an original color image, such as a photographic negative, is sampled periodically in three colors (e.g. red, green and blue) to produce a digital representation of the original color image. The digital color image is processed by applying digital image processing functions to improve such image qualities as sharpness, tone-scale, and color balance. The processed digital color image is then displayed on a display medium such as photographic film or paper.

Figure 3:
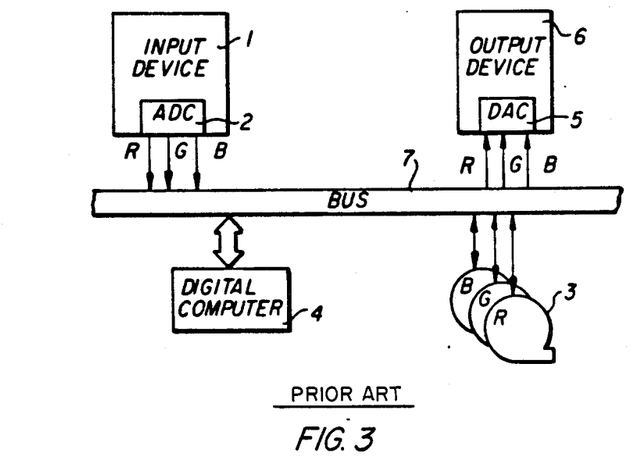
FIG. 3 is a schematic diagram illustrating generic prior art digital color image processing apparatus useful for practicing the present invention.

FIG. 3 is a schematic diagram illustrating apparatus for digital image processing. Such apparatus includes an input device 1 for sampling the original color image in each of three colors, and analog-to-digital converters 2 for producing the digital color image in the three colors. Commonly employed input devices include drum and flat bed scanners, linear and area solid state image sensing arrays, and CRT and laser flying spot scanners, each being provided with appropriate color filters to produce the color separations.

Each digital color separation image is stored in a mass storage memory 3, such as a solid state memory frame-buffer, magnetic tape or disc storage device. A digital computer 4 applies the various image processing functions to the digital color image to produce the processed digital color image.

The digital computer 4 may comprise a main frame general purpose digital computer, or for higher speed operation, a digital computer specially configured for high speed digital processing of color images.

The processed digital color image is converted to sampled analog form by digital-to-analog converters 5 and is displayed on an output device 6 such as a drum or flat bed graphic arts scanner, or a CRT or laser flying spot scanner. The elements of the image reproduction apparatus communicate via a data and control bus 7.

As noted above, among the processing functions performed by the digital computer are the improvement of the tone-scale and color balance of the color image. In the article entitled "Tone Correction of Color Picture by Histogram Modification" by Yoichi Miyake, Nippon Shashin Sakkaishi, V. 48(2), pp. 94–101, 1980, the author proposes a digital color image processing method wherein the tone-scale corrections are effected by modifying the histogram of color values of the green separation image. Color corrections are implemented by solving a conventional set of color masking equations of the form:

$$R' = a_{11}R + a_{12}G + a_{13}B \quad (1)$$

$$G' = a_{21}R + a_{22}G + a_{23}B \quad (2)$$

$$B' = a_{31}R + a_{32}G + a_{33}B \quad (3)$$

where the matrix of color correction coefficients $a_{ij}$ are determined primarily by the characteristics of the input and output media.

An improvement to this process wherein both tone scale and color balance are corrected using histogram modification techniques is disclosed in copending U.S. patent application Ser. No. 730,627 filed May 6, 1985, by Alkofer.

According to the digital color image processing method of Alkofer, a Laplacian filter is applied to each of the color components of the image to detect local contrast. The color values are divided into contrast intervals, and one of the contrast intervals is selected based on the similarity of the histograms of color values in the selected contrast interval. The histograms of color values in the selected contrast interval are normalized to produce color reproduction functions, and the color reproduction functions are applied to the color components of the digital color image.

The method of Alkofer is based upon two principle observations regarding the statistical properties of the color values in a high quality color image. The first of these principles is that a truly random sample of color values (e.g. photographic density or log radiance) in a high quality color image will form a normal (Gaussian) distribution. The second principle is that the standard deviation of a random sample of color values is invariant with respect to wavelength (i.e. color). A truly random sample of color values of one color will have the same standard deviation as a truly random sample of another color.

The first principle noted above implies that a function that normalizes a random sample of color values will serve well as a color reproduction function, assuming that any deviation from normality in the random sample was caused by some "problem" with the original. The first principle combined with the second principle noted above implies that color values in all three colors having an equal distance in their number of standard deviations from the means of their respective color distributions should always combine to produce a neutral (i.e. gray).

The degree of success (i.e. the appropriateness of the color corrections) achievable by this method is a strong function of the randomness of the sample of color values used to generate the color reproduction functions. Alkofer relied upon the selection of color values from the contrast interval based upon the similarities of the histograms of color values in the contrast interval, to insure the desired randomness in selection of color values from the image. While Alkofer's method represents a subtantial improvement over the prior art, there is still observed to be some situations in which the "randomness" in selecting color values is perturbed by large areas where film grain noise predominates in an image (such as blue sky, causing a subtle yellow shift in the processed image) or areas of fine texture (such as grass or foilage, causing a subtle magenta shift in the processed image).

It is the object of the present invention to provide an improved color digital image processing method, and in particular to provide an improved method for sampling the color values in a color image for use in normalizing the sample of color values to produce color reproduction functions.

DISCLOSURE OF THE INVENTION

The above objects are achieved according to the present invention by operating on a luminance component of the digital color image with a detail detection operator to detect regions of the image representing luminance detail. The regions of the image having luminance detail are then operated on with a contrast detection filter for each color, and the color values in the luminance detail region are separated into contrast intervals. One of the contrast intervals is selected based upon the similarity in shape of the color value histograms in the contrast interval, and the histograms in the selected contrast interval are normalized to produce a set of color reproduction functions. The color reproduction functions are then applied to the original color digital image to produce the processed color digital image.

According to one mode of practicing the invention, the luminance detail detection operation includes applying a plurality of edge enhancement operators to a luminance component image, summing their outputs, and thresholding the sum to detect the detail regions of the luminance component.

BRIEF DESCRIPTION OF THE DRAWINGS

The invention is described with reference to the drawings, wherein.

MODES OF CARRYING OUT THE INVENTION

Figure 1:
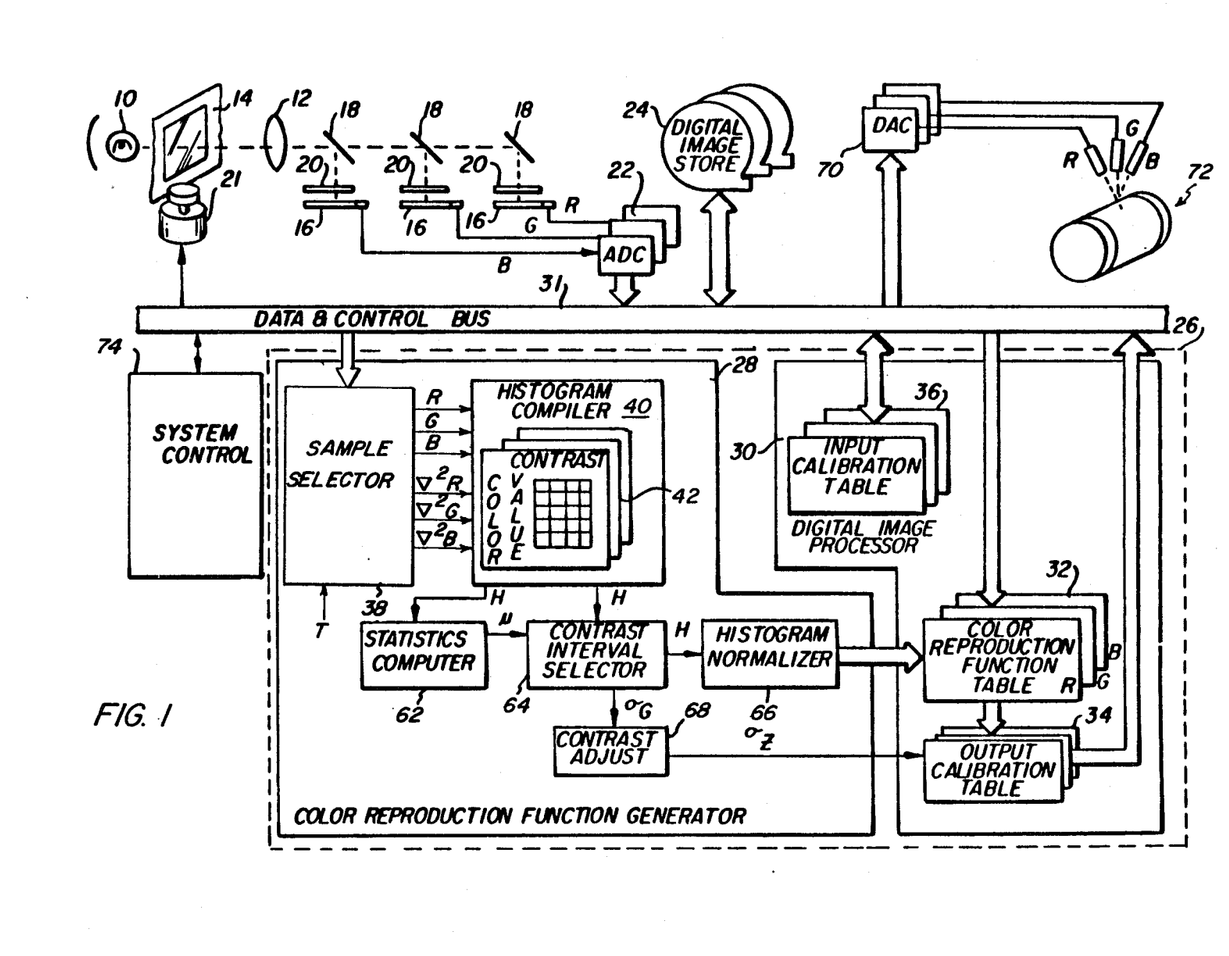
FIG. 1 is a schematic diagram, illustrating a scanning color photographic printer for carrying out the digital color image processing method according to the present invention.

Turning now to FIG. 1, an example of a scanning color photogaphic printer used to practice the present invention will be described.

The input device includes a light source 10 and lens 12 for projecting an image of color negative film 14 onto three solid state image sensing arrays 16, such as CCD image sensors. The image is directed to the image sensing array 16 by dichroic beam splitters 18 through color trimming filters 20, to form a red, green and blue separation image on the respective image sensors. A film advance motor 21 advances the film in the printer. The image sensors 16 scan the color photographic negatives to produce three color separation signals R, G and B. The signals thus produced are supplied to analog-to-digital converters 22 that each produce an 8-bit output code representing one of 256 possible signal levels for each sample point in the three colors.

The digital color image signals are stored in a digital image storage memory 24, such as a magnetic tape, disc, or solid state semiconductor memory. The digital color image signals are processed in a digital computer 26. A DEC 2060 mainframe computer was used.

The digital computer 26 is programmed to include a color reproduction function generator 28 and a digital image processor 30 that applies color reproduction functions generated by color reproduction function generator 28 to the digital color image. The color reproduction function generator 28 receives the digital color image from the digital image storage device 24 via data and control bus 31 and generates a color reproduction function table 32 for each color. The color reproduction function generator 28 also generates a multiplicative constant $\sigma_z$ for adjusting the contrast of the processed image as described below and supplies the constant to three output calibration tables 34.

Prior to storing the digital color image in digital image store 24, each input signal level is converted to an input color value, such as photographic density, by a known scanner calibration function. The calibration function for each color is implemented in the form of a look up table 36 in the digital image processor 30, to convert each 8-bit input value to an 8-bit value representing the color negative density at the scanning point.

The color reproduction function generator 28 includes a sample selector 38 for selecting samples from the luminance detail areas of the image, measuring the local contrast of these areas, and supplying the color value samples (R, G, B) and the contrast value $\nabla^2 R$, $\nabla^2 G$, $\nabla^2 B$ to a histogram compiler 40. The histogram compiler 40 compiles the color values from a plurality of contrast intervals in each color, in a plurality of histogram memories 42.

Figure 2:
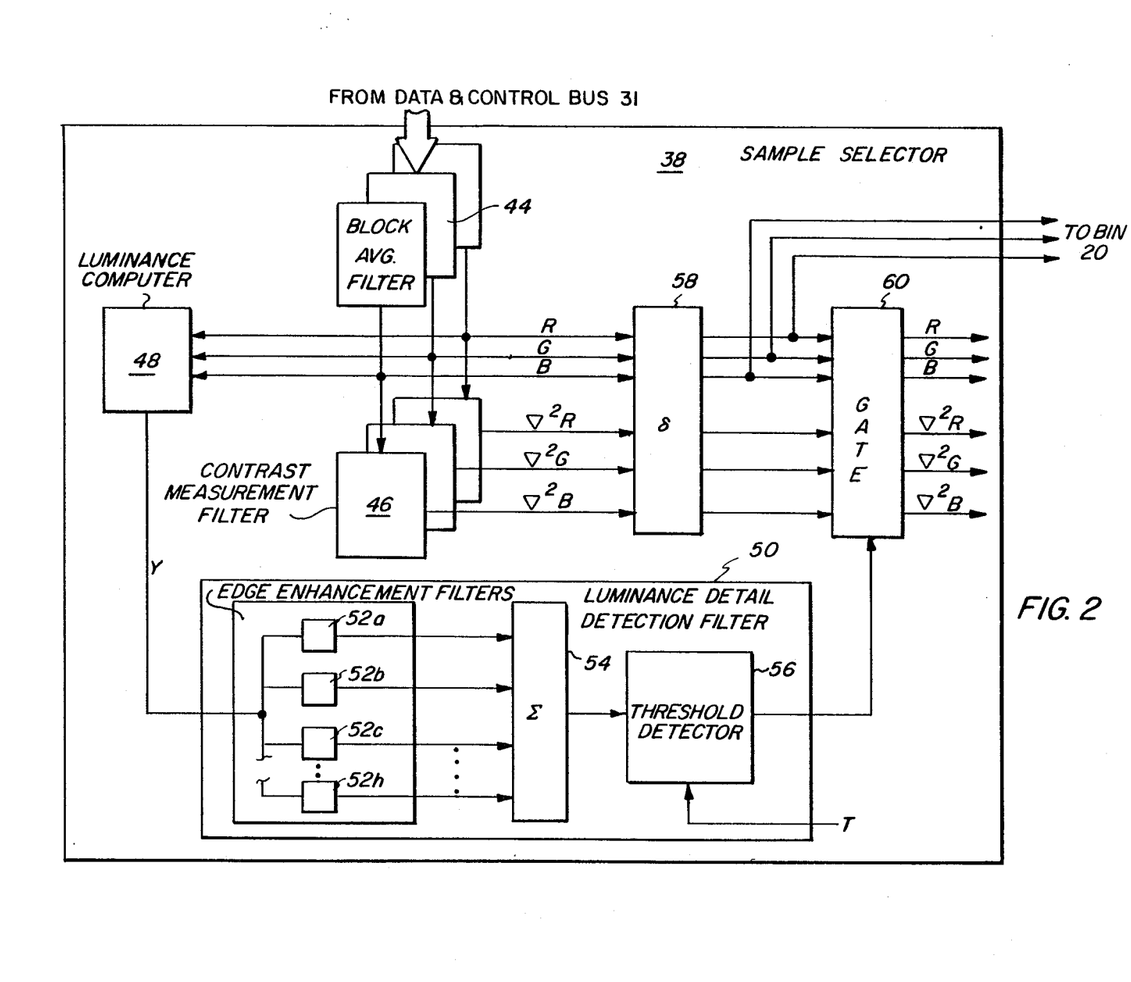
FIG. 2 is a schematic diagram further illustrating the sample selection portion of the apparatus shown in FIG. 1.

FIG. 2 shows the sample selector 38 in further detail. The sample selector 38 includes a set of digital filters 44 for performing a block average on the color values of the red, green and blue color components of the image. A set of digital filters 46 measure the contrast of the color components of the image around each block averaged color value. A luminance computer 48 receives the block averaged color values and computes a luminance value Y at each point in the image. The luminance values Y are supplied to a luminance detail detection filter 50 that includes a plurality of edge enhancement filters 52a-52h; a summer 54 that squares the outputs of the edge enhancement filters and sums the squares, and a threshold detector 56 that detects when the value of the output of the summer 54 exceeds a predetermined threshold value T. The respective output values from the block average filters 44 and the contrast measurement filters 46 are delayed by an appropriate amount of time by delay 58 and applied to the input of the gate 60. Gate 60 is controlled by the output of the luminance detail detection filter 50 such that only color values and contrast values in regions of luminance detail are allowed to pass through gate 60 to the histogram compiler 40. All color values bypass gate 60 and are applied directly to bin 20 of the histogram compiler as described below.

Figure 4:
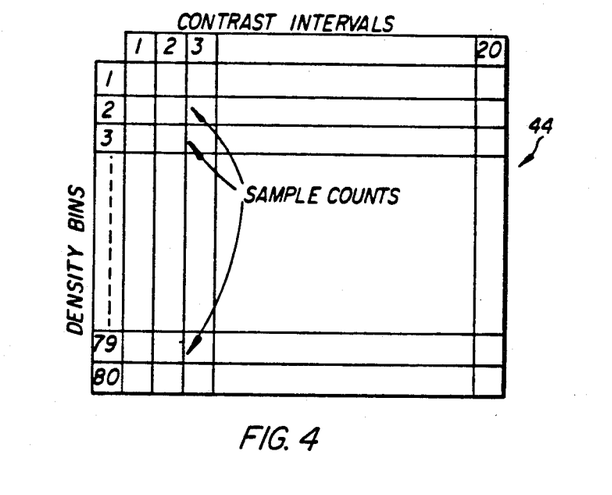
FIG. 4 is a schematic diagram showing the organization of the histogram memories.
Figure 5:
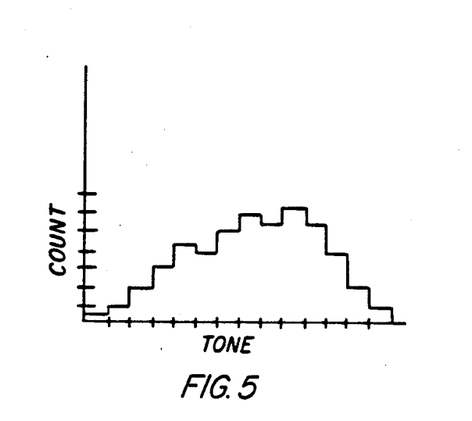
FIG. 5 is a graph illustrating a color value histogram from one of the constrast intervals shown in FIG. 3.

FIG. 4 shows, in a graphic way, the organization of each of the histogram memories 42. There are twenty contrast interval bins for each color, each of 19 contrast intervals has a width of 0.04 log contrast units. The width of the contrast intervals is chosen to be approximately twice the minimum visual log constrast threshold. Contrast interval bin 20 is loaded with all of the color value samples from the whole image regardless of contrast, bypassing gate 60. The 256 color values are divided into 80 color value (density) bins, for a resolution of 0.05 density units per density bin. Counts are accumulated in the appropriate density bins in the histogram memories until all of the color values from the digital color image are counted. FIG. 5 shows a graphic example of one of the color histograms representing one of the contrast intervals in one of the three colors.

Returning to FIG. 1, a statistics computer 62 in the color reproduction function generator 28 computes the statistical moments $\mu$ of the histograms H in the histogram memories 42 as described below.

A contrast interval selector 44 receives the statistical moments $\mu$ from the statistics computer 62 and selects a contrast interval on the basis of the statistical moments of the color value distributions in the contrast intervals and supplies the histograms H from the selected contrast interval to a histogram normalizer 66. The histogram normalizer 66 normalizes the histograms from the selected contrast interval to generate the color reproduction function lookup tables 32 that are used by the digital image processor 30.

A contrast-adjustment computer 68 receives the standard deviation $\sigma_G$ of the green color values in the selected contrast interval and generates a multiplicative constant $\sigma_z$ used to determine the contrast of the processed image in output device calibration tables 34. All the processed color values in all three colors are multiplied by this same constant.

The color reproduction function lookup tables 32 relate each of the 256 possible input values in the respective colors to one of 256 possible output values. After the color reproduction function lookup tables 32 have been generated, the digital image processor 30 processes the digital image by applying the color reproduction functions to the respective color components of the digital color image. The output calibration functions are then applied to the respective color components of the processed digital color image. The processed digital color image is converted back to analog form by digital-to-analog converters 70. The processed analog signal is then applied to the output scanning device 72 to reproduce the image. The output device 72 is a drum-type scanner having red, green and blue laser light sources that are modulated by the respective analog color signals to expose a light sensitive medium such as color photographic paper.

Figure 6:
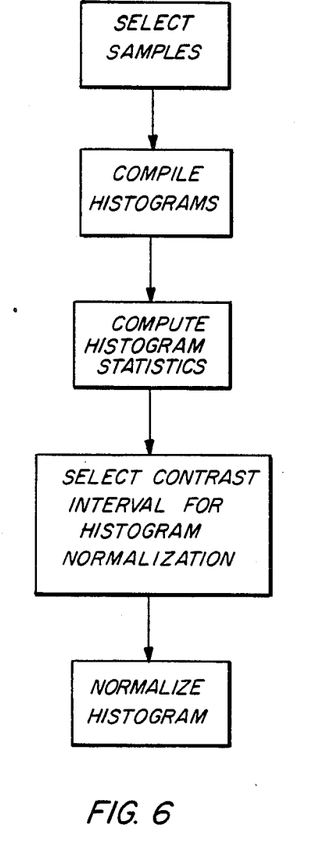
FIGS. 6-8, 9A-9B, and 10 are flow charts illustrating the method of generating the color reproduction functions according to the present invention.
Figure 7:
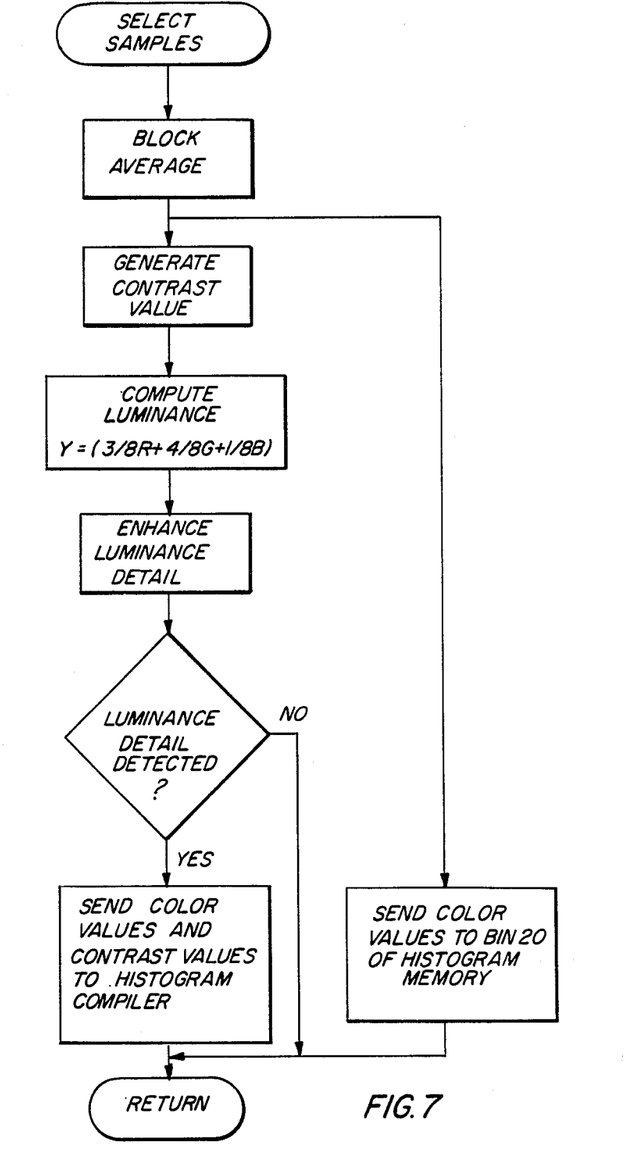

Referring first to the flow chart of FIG. 6, the processing steps performed on the color digital image to generate the respective color reproduction functions will be described. Color value samples are selected from the digital image, and compiled into histograms. The statistics of histograms are computed, and a contrast interval is selected for histogram normalization. Finally, the histograms in the contrast interval are normalized to generate the color reproduction functions. FIG. 7 shows the steps involved in selecting samples for the histogram compilation. First a block average of the color values of the sampled digital image is formed. This is accomplished by applying a digital filter to the digital image color values of the form:

$$\begin{bmatrix} 1 & 1 & 1 & 1 \\ 1 & 1 & 1 & 1 \\ 1 & 1 & 1 & 1 \\ 1 & 1 & 1 & 1 \end{bmatrix} \Big/ 16. \tag{4}$$

This averaging is performed by the block average filters 44 shown in FIG. 2, to reduce the effects of film grain and other sources of noise on the color value statistics.

Next, a digital filter representing a Laplacian operator of the form:

$$\begin{bmatrix} 0 & -1 & 0 \\ -1 & 4 & -1 \\ 0 & -1 & 0 \end{bmatrix} \tag{5}$$

is applied to the block averaged color values of the digital image to measure the contrast of the image at each block averaged sample point. This operation is performed by the contrast measurement filters 46 in FIG. 2.

A luminance value Y is computed from the red, green and blue color values according to the formula:

$$(Y) = (\tfrac{3}{8}R + 4/8G + \tfrac{1}{8}B) \tag{6}$$

Next the luminance detail is enhanced by applying a set of two-dimensional digital filters to the luminance component of the image. The set of two-dimensional detail enhancement filters were derived by taking the average, gradient ($\nabla$), and Laplacian ($\nabla^2$) in both the X and Y directions in the image as shown in Table 1 below.

TABLE 1

| Y | X Average (121) | X Gradient (10-1) | X Laplacian (1-21) |
|---|---|---|---|
| Average $\begin{Bmatrix} 1 \\ 2 \\ 1 \end{Bmatrix}$ | | $\begin{Bmatrix} 1 & 0 & -1 \\ 2 & 0 & -2 \\ 1 & 0 & -1 \end{Bmatrix}$ | $\begin{Bmatrix} 1 & -2 & 1 \\ 2 & -4 & 2 \\ 1 & -2 & 1 \end{Bmatrix}$ |
| Gradient $\begin{Bmatrix} 1 \\ 0 \\ -1 \end{Bmatrix}$ | $\begin{Bmatrix} 1 & 2 & 1 \\ 0 & 0 & 0 \\ -1 & -2 & -1 \end{Bmatrix}$ | $\begin{Bmatrix} 1 & 0 & -1 \\ 0 & 0 & 0 \\ -1 & 0 & 1 \end{Bmatrix}$ | $\begin{Bmatrix} 1 & -2 & 1 \\ 0 & 0 & 0 \\ -1 & 2 & -1 \end{Bmatrix}$ |
| Laplacian $\begin{Bmatrix} 1 \\ -2 \\ 1 \end{Bmatrix}$ | $\begin{Bmatrix} 1 & 2 & 1 \\ -2 & -4 & -2 \\ 1 & 2 & 1 \end{Bmatrix}$ | $\begin{Bmatrix} 1 & 0 & -1 \\ -2 & 0 & 2 \\ 1 & 0 & -1 \end{Bmatrix}$ | $\begin{Bmatrix} 1 & -2 & 1 \\ -2 & 4 & -2 \\ 1 & -2 & 1 \end{Bmatrix}$ |

System control electronics 74 controls and coordinates the operation of the input and output scanning devices and the digital image processing computer 26.

The method of generating the color reproduction functions will now be described in more detail with reference to the flow charts of FIGS. 6-10.

The output of each of these 8 digital filters is squared and then divided by an appropriate coefficient to normalize the noise level in each output. Alternatively, the square root of the noise normalization coefficients may be included in the operator itself. The noise normalization coefficients are shown in Table 2 below.

TABLE 2

| Y | X AVG. | X ▽ | X ▽² |
|---|---|---|---|
| AVG. |  | 12 | 36 |
| ▽ | 12 | 4 | 12 |
| ▽² | 36 | 12 | 36 |

The 8 detail enhancement filters are shown as 52a–h in FIG. 2.

The noise normalized squared outputs of the 8 detail enhancement filters are then summed to yield a detail detection signal. Since the statistics of the sum of the normalized squared outputs from the detail detection filters is a Chi-square distribution for Gaussian random noise, this detail enhanced signal is called a Chi-square discriminant. The Chi-square discriminant proves to be very useful for separating image detail from noise, especially in noisy regions of the image. A threshold T is selected such that most of the noisy uniform area and fine textured area are rejected, and a thresholding operation is performed on the Chi-square discriminant. Regions of the image where the Chi-square discriminant is greater than the threshold value T are the regions having luminance detail due to actual scene content rather than noise. Whenever the value of the Chi-square discriminant exceeds the threshold value T, the color values and the contrast values from the image are sent to the histogram compiler to be compiled into one of the 19 bins depending upon the contrast. This is accomplished by gate 60 in FIG. 2.

It has been found by experiment that the computation of the Chi-square discriminant can be simplified without substantially sacrificing the performance of the method by taking the sum of the squares of the outputs of just the two average-gradient digital filters. A further simplification that still retains a substantial amount of the benefits of the invention is to produce the Chi-square discriminant from the sum of the absolute values of the two average-gradient filters, thereby eliminating the need for squaring the outputs.

The respective histograms in each contrast interval for each color component are compiled as discussed above, and their statistics computed. A contrast interval is selected on the basis of the shape of the histograms of the respective color values in the interval and the histograms of color values in the selected contrast interval are normalized to generate the respective color reproduction functions.

Figure 8:
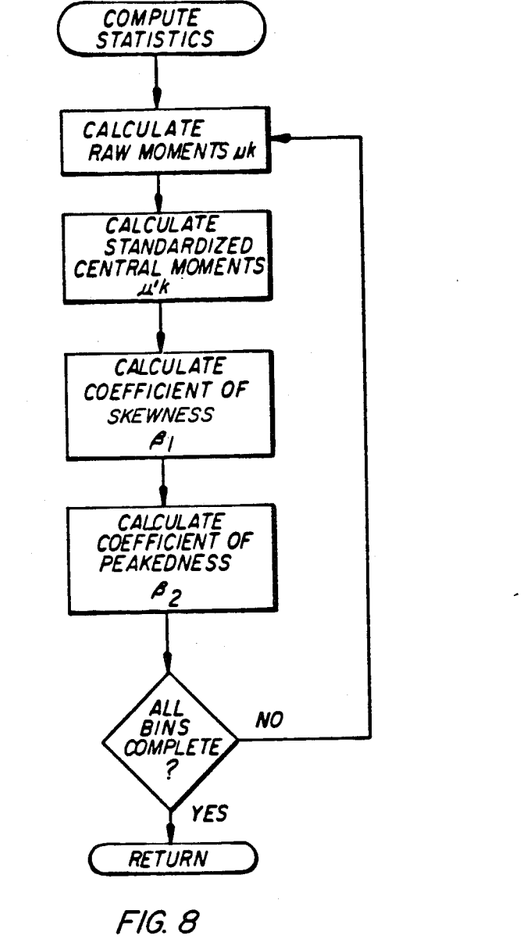

FIG. 8 is a flow chart showing the steps involved in computing the histogram statistics. The raw moments $\mu_k$ taken about the mean, are computed as follows:

$$\mu_k = \frac{1}{N}\left\{\sum_{i=1}^{N}(x_i - \bar{x})^k\right\} \quad (7)$$

where

N is total number of samples in the contrast interval;
$x_i$ is a color value; and
$\bar{x}$ is the mean color value. The standardized central moments $\mu'_k$ are calculated as follows:

$$\mu'_k = \frac{\mu_k}{\sigma^k}, \text{ where } \sigma = \sqrt{\mu_2} \quad (8)$$

The coefficient of symmetry (coefficient of skewness) for each distribution is then represented as $$\beta_1 = (\mu'_3)^2 \quad (9)$$

and the coefficient of peakedness (kurtosis plus 3) is represented as $$\beta_2 = \mu'_4 \quad (10)$$

Figure 9A:
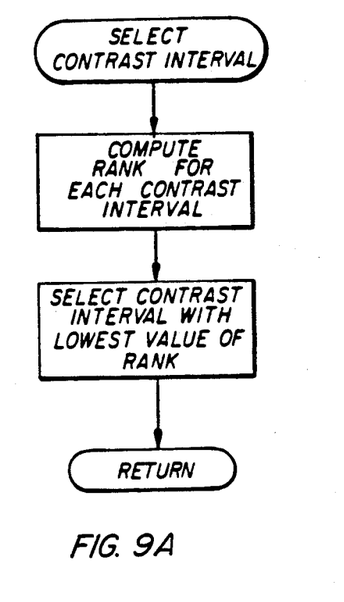

Referring now to FIG. 9A, the steps involved in selecting the contrast interval according to one method will be described. One selection criteria that has been found to work well is a combination of the normality of the sample of green color values and the sameness of the distribution of the red and blue color values. A function called RANK is defined as follows:

$$\text{RANK} = \sqrt{\beta_{1G}^2 + (\beta_{2G} - 3)^2 + |\beta_{1R} - \beta_{1G}| +} \quad (11)$$
$$\overline{|\beta_{2R} - \beta_{2G}| + |\beta_{1B} - \beta_{1G}| + |\beta_{2B} - \beta_{2G}|}$$

where $\beta_{1G}$ is the skewness of the distribution of green color values in the contrast interval being evaluated, etc. The contrast interval with the lowest value of RANK is selected.

Figure 9B:
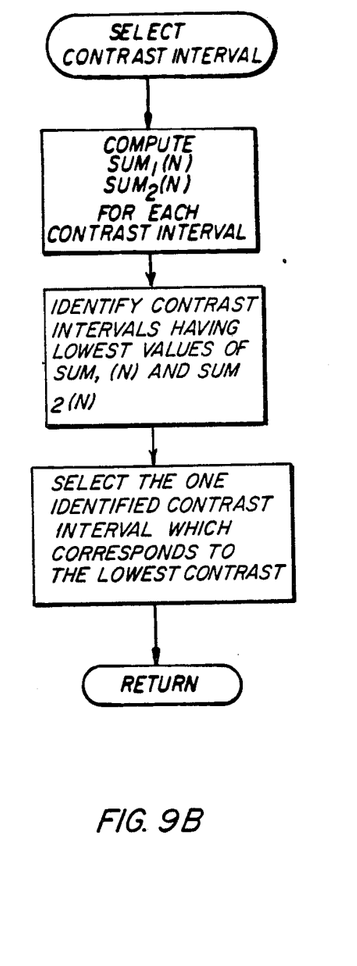

According to an alternative method (shown in FIG. 9B), the contrast interval selection criteria involves the similarity of shape of the three color value distributions in the contrast interval. The selection criteria compares the skewness of the color value distributions in each of the contrast intervals as follows:

$$\text{SUM}_1(N) = |\beta_{1R} - \beta_{1G}| + |\beta_{1B} - \beta_{1G}| + |\beta_{1R} - \beta_{1B}| \quad (12)$$

where $\text{SUM}_1$ (N) is a measure of the difference in skewness between the three color value distributions in the Nth contrast interval. The contrast interval having the most similar distribution, i.e. the lowest value of $\text{SUM}_1$ (N) is identified.

Next, the peakedness of the three color value distributions in each contrast interval is compared as follows:

$$\text{SUM}_2(N) = |\beta_{2R} - \beta_{2G}| + |\beta_{2B} - \beta_{2G}| + |\beta_{2R} - \beta_{2B}| \quad (13)$$

where $\text{SUM}_2$ (N) is a measure of difference in peakedness between the three color value distribution in the Nth contrast interval. The contrast interval having the most similar distributions, i.e. the lowest value of $\text{SUM}_2$ (N) is identified.

Finally, the lowest contrast interval (i.e. the interval representing the lowest contrast) between the two identified contrast intervals is selected.

Optionally, to insure that there is a statistically significant number of color values in the contrast interval, a check on the total count of color values in the interval is performed. If the total count in each color is less than some predetermined number, say 1000, the contrast interval is not selected. This check is continued until a contrast interval having at least the required minimum number of color values is chosen.

Figure 10:
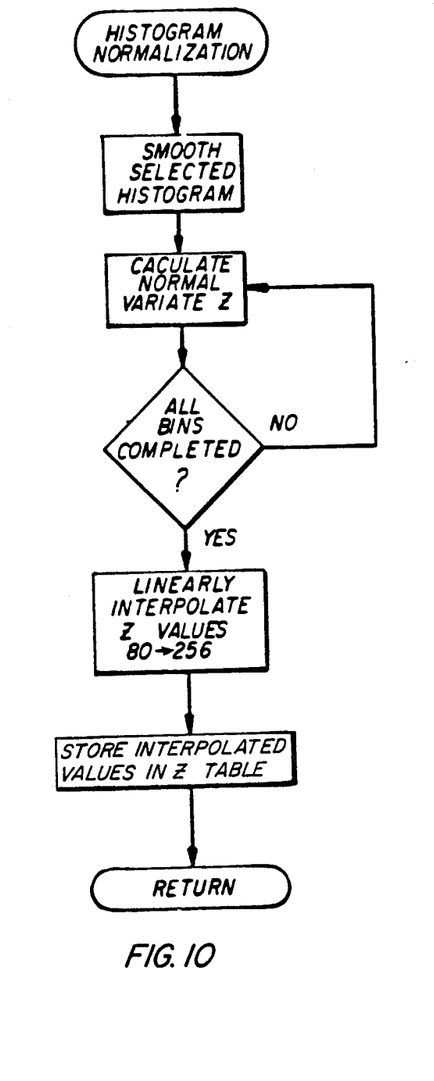

Turning now to FIG. 10, the steps involved in normalizing the color histograms in the selected contrast interval to generate the color reproduction functions will be described. To normalize a histogram, the standard normal variate Z for all 80 color value bins in the contrast interval is computed. First however, an average smoothing operation is performed on the selected histogram to remove any spikes. The smoothing is performed on the counts in 3 consecutive color value bins as follows:

$$h_i = \tfrac{1}{3}(h'_{i-1} + h'_i + h'_{i+1}) \qquad (14)$$

where
  $h'_i$ is the count in bin i and
  $h_i$ is the smoothed value.

Next, the standard normal variate Z is calculated for the smoothed values of the histogram as follows (from *Approximations for Digital Computers*, Hastings C., Princeton Univ. Press.):

$$Z_j = t_j - \frac{a_0 + a_1 t_j}{1 + b_1 t_j + b_2 t_j^2} \qquad (15)$$

where $$t_j = \sqrt{\ln(1/P_j^2)}$$

$a_0 = 2.30753 \qquad b_1 = .99229$
$a_1 = 0.27061 \qquad b_2 = .04481$

The probability $P_j$ for each of the 80 bins is given by $$P_j = \frac{\sum_{i=1}^{j} h_i}{\sum_{i=1}^{80} h_i} \qquad (16)$$

where
  $h_i$ are the smoothed counts in the ith color value bin, and
  j=1–80.

Next, the Z values are linearly interpolated from 80 to 256 values to provide a Z value for each of the 256 possible scanner inputs represented by the 8-bit digital code. Finally the 256 Z values are stored in the color reproduction function lookup tables 32. This process is applied to each of the three samples of color values in the selected contrast interval.

Figure 11:
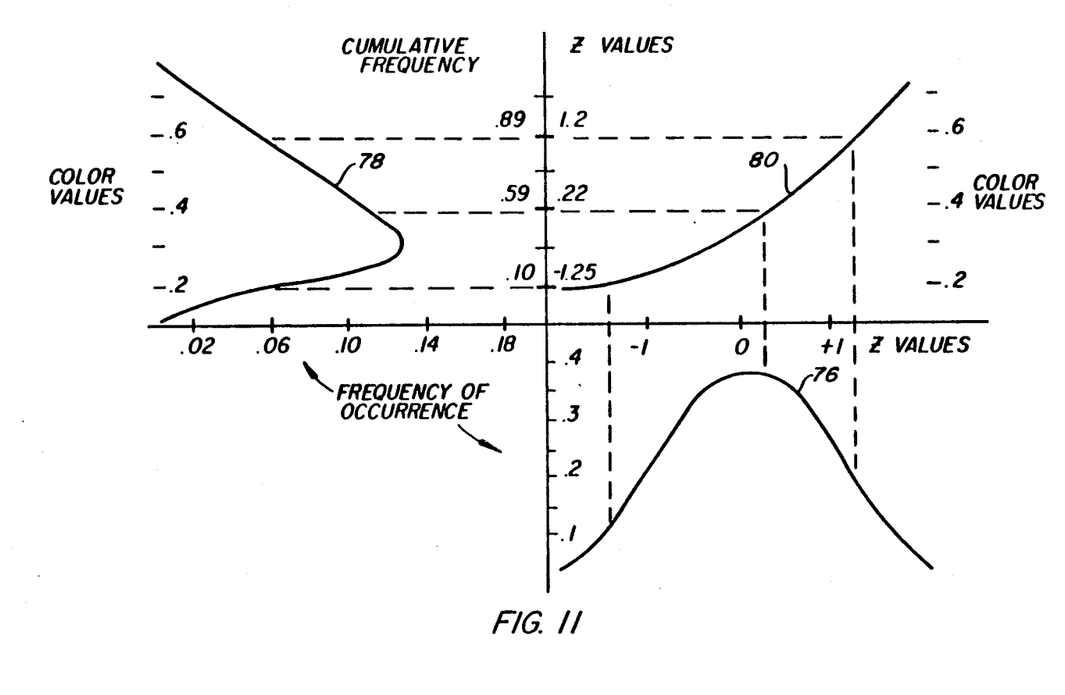
FIG. 11 is a graph showing the form of the color reproduction functions generated according to the method outlined in FIG. 10.

FIG. 11 is a graph showing the form of the color reproduction functions produced by normalizing the samples of color values. In the lower right quadrant of the graph, a curve labeled 76 represents a standard normal distribution showing the probability of the occurrence of a value plotted against the standard normal variate Z. In the upper left quadrant of the graph, the curve labeled 78 represents the sample of color values from the image, plotted against relative probability of occurrence. The central ordinate of the graph relates the relative probability $P_j$ of the color value distribution to Z values according to the relationship defined by equation 14. The color reproduction curve, labeled 80, maps the Z values on the ordinate to the same Z values on the abcissa. A color value scale on the far upper right of the diagram, congruent to the color value scale on the far left, shows how the color reproduction function relates color values to Z values.

After the three color reproduction function lookup tables are generated, all of the color values of the image are processed by applying the respective color reproduction functions to them. At this point, the processed color samples from the image are dimensionless quantities representing the Z values.

To recover the processed image, these dimensionless quantities are given magnitudes with respect to the original image and the output medium by multiplying the Z values with a multiplier $\sigma_z$ that adjusts the contrast of the processed image. To adjust the color balance of the image, a constant term is added to each of the three color values. The constant term relates the Z values in each color to the mean density of the output medium for the respective color, thereby causing equal Z values in all three colors to be reproduced as a shade of gray.

Appropriate values for the multiplier $\sigma_z$ that adjusts contrast and the additive constants that determined the color balance of the processed image are determined as follows. The multiplier is computed based on the statistics of the green color values alone, but is applied to all three colors. The intrinsic contrast of natural scenes can be quantified in terms of the standard deviation of log reflectance of edges in the scene or the density representation of those log reflectances in the photographic image. On the average the approximate relationship between the two is given by:

$$\sigma_D = \overline{G} \cdot \sigma_R \qquad (17)$$

where:
  $G$ = average gradient of the photographic film (relates $\sigma_R$ to some specific reproduction medium contrast)
  $\sigma_R$ = standard deviation of log reflectance based on a large number of original scenes
  $\sigma_D$ = standard deviation of density Typical values for $\sigma_R$ and $\overline{G}$ for color photographic film are 0.31 and 0.68 respectively, such that $\sigma_D$ is 0.21. Departures from this average contrast must be compensated. A general equation may be stated as:

$$\sigma_z = m \cdot f(\sigma_s) + b \qquad (18)$$

where:
  $\sigma_s$ = individual scene standard deviation, from the selected contrast interval
  m and b are system dependent constants and
  $f(\sigma_s)$ is some function of the sample standard deviation
  $\sigma_z$ = the multiplier applied to the values obtained form the color reproduction function.

A simple and satisfactory implementation is obtained from:

$$b = \sigma_D \cdot (1.0 - m) \qquad (19)$$

$$\sigma_z = m \cdot \sigma_s + b \qquad (20)$$

where:
  m is typically between 0.6 and 0.8.

The sign of $\sigma_z$ is positive if the reproduction has the same polarity as the original image (negative-to-negative or positive-to-positive). If the reproduction has a polarity of an opposite sense with respect to the original, e.g., negative-to-positive, then the sign of $\sigma_z$ is negative.

Note that the adjustment of the contrast in (20) does not affect scenes having the average contrast ($\sigma_D$), nor does it affect the mean value of tone in the scene, since in terms of Z (the normal variate) the average value remains 0. This is not only a computational convenience in terms of adjusting the contrast, but also in adjusting the color balance of the processed image with respect to the reproduction medium. For example, if a color negative image is to be printed directly onto color photographic paper, the log exposure for the desired mean paper density for each color is simply added to the translated, contrast adjusted values of the respective colors. The complete calculation is given by:

$$\log E_{ZD} = -\sigma_r Z_D + \log E_A \qquad (21)$$

where:

$\log E_A$ = log exposure required to obtain the aim paper density $Z_D$ = translated Z value for some input density in the original image $\log E_{ZD}$ = log exposure for $Z_D$.

Industrial Applicability and Advantages

The digital color image processing method according to the present invention is useful in the graphic arts and photographic printing fields to provide automatic tone-scale adjustment and color balance of digitally processed images. The method is advantageous in that a greater percentage of high quality images are produced automatically than by the methods of the prior art.

By operating on a luminance component of the digital color image with a luminance detail detection operator to detect regions of the image having luminance details, and operating on the color components of the color image in the regions of the luminance detail to compile the color histograms employed in the histogram selection technique, the influence of noise and fine texture on the histograms are further reduced.

I claim:

1. A digital color image processing method comprising the steps of:
   a. operating on a luminance component Y of a digital color image with an image detail detection operator to detect regions of the image representing luminance detail;
   b. operating on color components of the digital image in the luminance detail regions with a contrast detection filter to detect the contrast of the color components of the image in the luminance detail regions;
   c. separating color values of the color components in the luminance detail regions into contrast intervals and forming a histogram of the color values of each of the color components in the contrast intervals;
   d. selecting one of the contrast intervals based upon the similarity in shape of the color value histograms in the selected contrast interval;
   e. forming color reproduction functions by normalizing the color value histograms in the selected contrast interval; and
   f. applying the color reproduction functions to the color values of the color components of the digital color image.

2. The digital color image processing method claimed in claim 1, wherein said detail detection operation includes applying a plurality of edge enhancement operators to the luminance component, summing the outputs of the edge enhancement operators, and thresholding the sum to detect the regions of the image representing luminance detail.

3. The digital color image processing method claimed in claim 2, wherein said edge enhancement operators are of the form:

$$\begin{pmatrix} 1 & 0 & -1 \\ 2 & 0 & -2 \\ 1 & 0 & -1 \end{pmatrix} \Big/ \sqrt{12} \ ; \begin{pmatrix} 1 & 2 & 1 \\ 0 & 0 & 0 \\ -1 & -2 & -1 \end{pmatrix} \Big/ \sqrt{12} \ ; \begin{pmatrix} 1 & -2 & 1 \\ 2 & -4 & 2 \\ 1 & -2 & 1 \end{pmatrix} \Big/ \sqrt{36} \ ;$$

$$\begin{pmatrix} 1 & 0 & -1 \\ 0 & 0 & 0 \\ -1 & 0 & 1 \end{pmatrix} \Big/ \sqrt{4} \ ; \begin{pmatrix} 1 & 2 & 1 \\ -2 & -4 & -2 \\ 1 & 2 & 1 \end{pmatrix} \Big/ \sqrt{36} \ ; \begin{pmatrix} 1 & -2 & 1 \\ -0 & 0 & 0 \\ -0 & 2 & -1 \end{pmatrix} \Big/ \sqrt{12} \ ;$$

$$\begin{pmatrix} 1 & 0 & -1 \\ -2 & 0 & 2 \\ 1 & 0 & -1 \end{pmatrix} \Big/ \sqrt{12} \ ; \begin{pmatrix} 1 & -2 & 1 \\ -2 & 4 & -2 \\ 1 & -2 & 1 \end{pmatrix} \Big/ \sqrt{36} \ ;$$

and said summing step involves taking the sum of the squares of the outputs of the operators.

4. The digital color image processing method claimed in claim 2, wherein said edge enhancement operators are of the form:

$$\begin{pmatrix} 1 & 0 & -1 \\ 2 & 0 & -2 \\ 1 & 0 & -1 \end{pmatrix} ; \begin{pmatrix} 1 & 2 & 1 \\ 0 & 0 & 0 \\ -1 & -2 & -1 \end{pmatrix},$$

and said summing step involves taking the sum of the squares of the outputs of the operators.

5. The digital color image processing method claimed in claim 2, wherein said edge enhancement operators are of the form:

$$\begin{pmatrix} 1 & 0 & -1 \\ 2 & 0 & -2 \\ 1 & 0 & -1 \end{pmatrix} ; \begin{pmatrix} 1 & 2 & 1 \\ 0 & 0 & 0 \\ -1 & -2 & -1 \end{pmatrix},$$

and said summing step involves taking the sum of the absolute values of the outputs of the operators.

6. The digital color image processing method claimed in claim 1, wherein said color components are R, G, B components and said luminance component Y is formed by the operation $$(Y) = (\tfrac{3}{8} R + 4/8 G + \tfrac{1}{8} B).$$

* * * * *